May 19, 1936.  G. A. GILLEN  2,040,934
MECHANICAL MOVEMENT
Filed Aug. 23, 1934  2 Sheets-Sheet 1

INVENTOR
George A. Gillen
BY
ATTORNEY

May 19, 1936.  G. A. GILLEN  2,040,934
MECHANICAL MOVEMENT
Filed Aug. 23, 1934  2 Sheets—Sheet 2
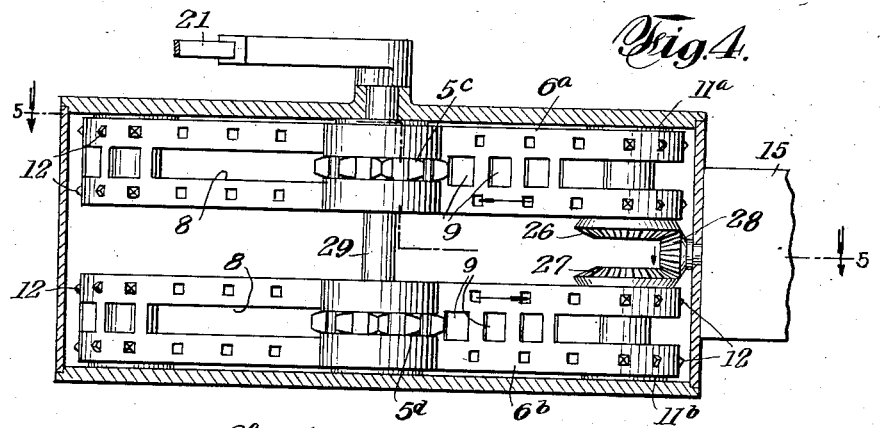
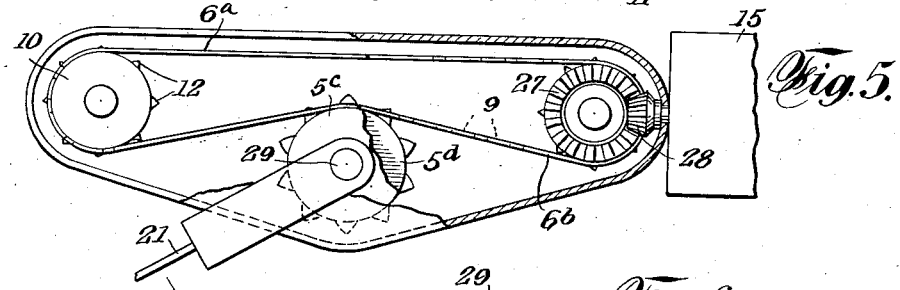
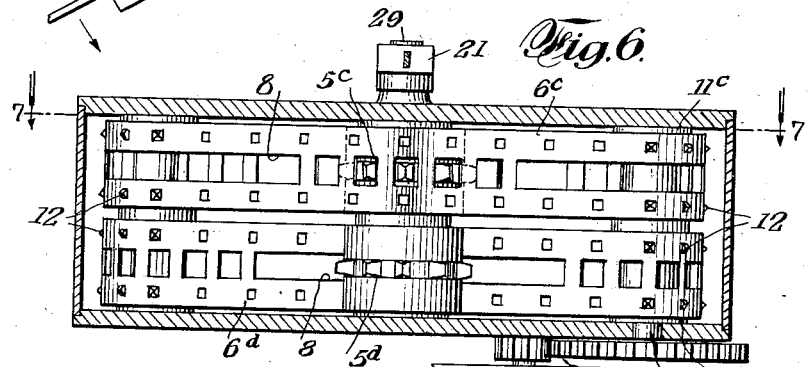
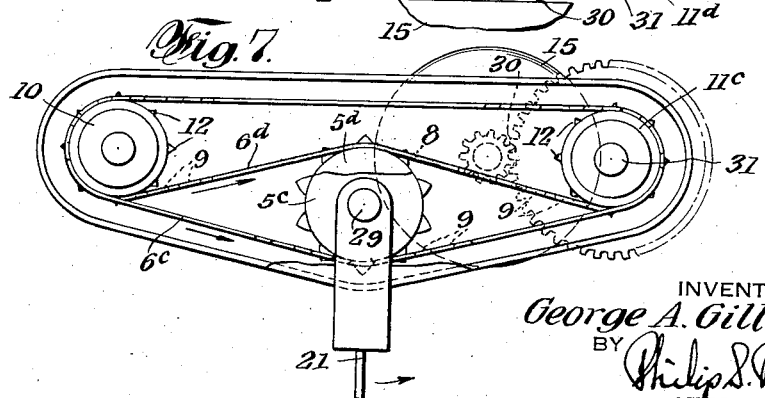
INVENTOR
George A. Gillen
BY
ATTORNEY Patented May 19, 1936

2,040,934

UNITED STATES PATENT OFFICE 2,040,934

MECHANICAL MOVEMENT

George A. Gillen, Bronx, N. Y.

Application August 23, 1934, Serial No. 741,049

13 Claims. (Cl. 74—37)

This invention relates to apparatus for effecting alternate reversals of movement.

The objects of the invention are to provide mechanism for alternately swinging, rotating or shifting a shaft or other element in opposite directions, which will be of simple practical design, made up of relatively few, inexpensive rugged parts, and which will be entirely practical and efficient for accomplishing the desired movements through different required distances and speeds.

The novel features of the invention by which the foregoing and other desirable objects are attained will appear in the course of the following specification, considered in conjunction with the drawing accompanying and forming part of the same.

In the drawings referred to, certain embodiments of the invention are illustrated, but as such illustration is primarily by way of disclosure, it will be appreciated that the structure may be changed and modified in various respects all within the true intent and broad scope of the invention.

Fig. 4 is a broken plan view of a further modification.

Fig. 5 is a broken sectional view substantially on line 5—5 of Fig. 4.

Fig. 6 is a broken plan of another form.

Fig. 7 is a broken sectional view substantially on line 7—7 of Fig. 6.

Briefly, the invention involves the combination of a sprocket gear or gears and a special driving belt or belts cooperating with said sprocket gear or gears and provided with open slots and with toothed portions to effect driving of the sprocket gear or gears in reverse directions.

Figure 1:
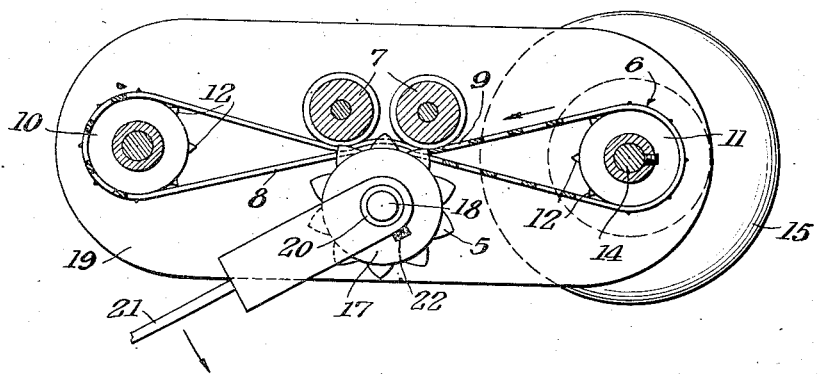
Fig. 1 is a broken partly sectional front view of one embodiment.
Figure 2:
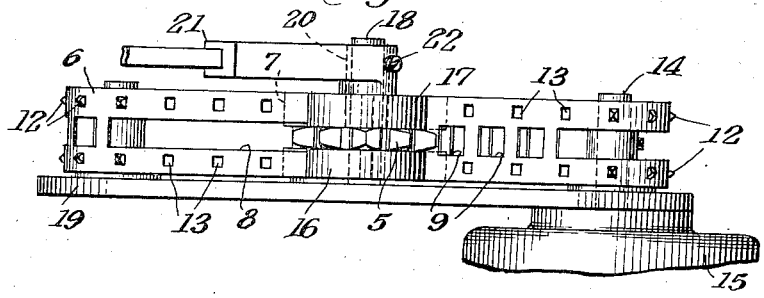
Fig. 2 is a broken bottom plan view of the structure shown in Fig. 1.

In Fig. 1, there is a single sprocket gear 5, and the driving belt 6, has the opposite sides of the same pressed together over the sprocket by guide rolls 7, so that the teeth of the sprocket may reach through an open slot 8, in one side of the belt into engagement with a set of sprocket bars or teeth 9, in the opposite run of the belt. These slotted and toothed portions of the belt are so disposed that in the travel of the belt, an idle or slotted portion in one run of the belt will always come opposite a toothed or active portion in the other run of the belt, where they pass over the sprocket.

The belt is shown supported at its opposite ends on sprockets 10, 11, these being shown as toothed at 12, to match sprocket holes 13, in the opposite edges of the belt and one of them being indicated as a driving sprocket fixed on a shaft 14, driven directly or through suitable reduction gearing by a motor 15.

The edge portions of the drive belt are supported at opposite sides of the driven sprocket in the illustration by idler rolls 16, 17, rotating freely at the opposite faces of the sprocket. In the particular construction shown, this sprocket and the idler rolls at the opposite sides of the same are rotatably supported on a fixed shaft or pivot stud 18, carried by a suitable base or frame 19, the inner rolls 16, being directly journalled on this stud and the outer roll 17, turning on the journal sleeve 20, of the sprocket. This sleeve of the sprocket constitutes the power take-off in the present disclosure, being shown as directly carrying the wiper arm 21, of a windshield wiper secured thereto by set screw 22.

With the parts constructed and arranged as shown and the belt travelling continuously in one direction, it will be seen that the sprocket 5, projecting as it does, through both runs of the belt will be turned first in one direction, by the teeth on one run and then in the opposite direction by teeth on the other run, the open slotted portions which come opposite the toothed portions permitting this alternate effectiveness of the two runs. The length of the effective portions determines the extent of turning movements of the sprocket and hence any desired angle of movement may be accomplished or even one or more complete rotations may be effected. The drive belt is well supported and guided at opposite sides of the sprocket by the idler rolls 7, 16 and 17, and so can effectively transmit the power without strain. This belt may be made of flexible steel strip punched with the sprocket openings in the edge portions and the alternate slots and sets of drive teeth in the intermediate portion.

Figure 3:
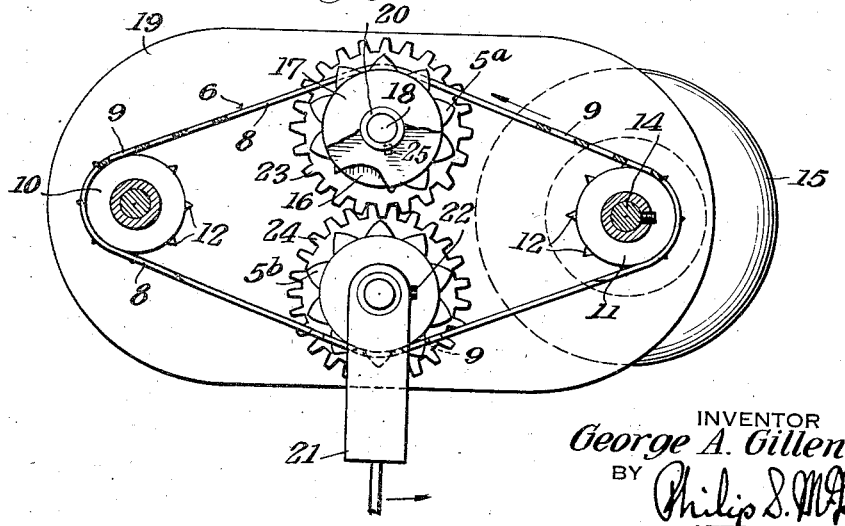
Fig. 3 is a partly sectional broken front elevation of a second embodiment of the invention.

The construction shown in Fig. 3 is generally similar to that described, the main distinction being that instead of bringing the two runs of the belt together over a single sprocket, the runs are separated and each run engages a sprocket of its own. These sprockets are designated 5a and 5b and they are shown as connected together by spur gears 23, 24, so that they turn in opposite directions and so that either one may drive the other. In the particular construction shown, these sprockets are keyed on their sleeves 20, as at 25, between the loose belt supporting rolls 16, 17, and these sleeves are fixed to or integral with the gears 23, 24.

The operation of this second form of the invention corresponds to that of the first in that while the toothed portion 9 of one belt run is driving, a slotted portion 8 in the other run will come opposite, rendering the second run ineffective. In this case however, there is an individual sprocket for each run. Hence in the position shown in Fig. 3, the lower sprocket 5b is being driven by a toothed portion 9 on the lower run of the belt and this sprocket through gears 24, 23, is turning the upper sprocket 5a idly backward through an open slotted portion 8, in the upper run ready to be engaged and driven by the succeeding set of teeth 9, as soon as the lower sprocket is reached by an open slotted portion 8 in the lower run of the belt. When this occurs, the upper sprocket is coupled to and driven by the belt and then it turns the lower sprocket in reverse direction. Here, as in the first instance, the extent of drive may be governed by the length of active portions in the belt.

While particularly adapted for windshield wiper purposes, it will be apparent that the invention may be applied to a great many other uses. The belt member and the cooperating sprocket or sprockets may be made in various ways to best suit the purposes for which the invention is used. By way of example, the teeth may be applied to the belt instead of being formed simply as sprocket holes cut through the belt.

The construction shown in Figs. 4, 5 and 6, 7, differ from those described, particularly in that two separate belts are provided with separate sprockets engaging the belts but connected together on the same shaft.

In Figs. 4 and 5, the two belts are shown at 6a and 6b, driven in opposite direction by bevel gears 26, 27, attached to the supporting and driving sprockets 11a and 11b and both engaged by the intermediate bevel pinion 28. The two driven sprockets 5c and 5d are fixed on a common supporting shaft 29, in position to engage the lower runs of the belts 6a and 6b respectively.

In the position shown in Fig. 5, a toothed portion 9 in the lower run of the far belt 6b, travelling toward the left is engaging the teeth of sprocket 5d, to turn shaft 29 left-handedly, while a slotted portion 8 in the lower run of the front belt 6a is passing over the teeth of sprocket 5c. At the end of such a left-handed movement, a toothed portion in the lower run of the front belt 6a will come into driving engagement with the teeth of the front sprocket 5c, while a correspondingly slotted portion in the lower run of the rearward belt will come into register with the teeth of the rearward sprocket 5d.

In Figs. 6 and 7, the bevel gear drive is omitted and both belts here designated 6c and 6d are driven in the same direction through reduction gearing 30, acting on shaft 31, carrying the sprockets 11c and 11d of both belts.

In this case, as in the last instance, the two driven sprockets 5c and 5d are mounted on the same shaft 29, but the first sprocket 5c engages over the top of the lower run of belt 6c, while the other sprocket engages the underside of the lower run of the belt 6d. As a consequence, with alternate disposition of toothed and slotted portions in the lower runs of the belts, one sprocket will be turned by one run in one direction, while the teeth of the other sprocket pass idly through an open slot in the lower run of the other belt.

In the position of parts indicated in Fig. 7, a toothed portion 9, in the lower run of the belt 6c is turning sprocket 5c left-handedly, while the other sprocket 5d is turning idly through a slotted portion 8 in the lower run of the other belt 6d.

One of the supporting sprockets, such as the idler sprocket 10 at the left in Figure 1 may be mounted adjustably so that it may be shifted to take up any undesirable slack in the belt, or other suitable belt tightening means may be provided.

What is claimed is:

1. A mechanical movement comprising a driving belt in an endless loop and having toothed driving portions in one run opposite open slotted portions in the opposite run and driven mechanism engaged by both said runs of the belt and toothed and positioned to be driven first in one direction by a toothed portion in one run and then in the opposite direction by a toothed portion in the opposite run of said belt.

2. A mechanical movement comprising a driving belt in an endless loop and having toothed driving portions in one run opposite open slotted portions in the opposite run and driven mechanism engaged by both said runs of the belt and toothed and positioned to be driven first in one direction by a toothed portion in one run and then in the opposite direction by a toothed portion in the opposite run of said belt, said driven mechanism including a sprocket with teeth running successively in the toothed and slotted portions of the belt.

3. A mechanical movement comprising a driving belt in an endless loop and having toothed driving portions in one run opposite open slotted portions in the opposite run and driven mechanism toothed and positioned to be driven by a toothed portion in one run and then by a toothed portion in the opposite run of said belt, said driven mechanism including a sprocket with teeth projecting through both reaches of the belt.

4. A mechanical movement comprising a driving belt in an endless loop and having toothed driving portions in one run opposite open slotted portions in the opposite run and driven mechanism toothed and positioned to be driven by a toothed portion in one run and then by a toothed portion in the opposite run of said belt, said driven mechanism including a sprocket with teeth projecting through both reaches of the belt and means confining both reaches in over-running engagement over one side of said sprocket.

5. A mechanical movement comprising a driving belt in an endless loop and having toothed driving portions in one run opposite open slotted portions in the opposite run and driven mechanism toothed and positioned to be driven by a toothed portion in one run and then by a toothed portion in the opposite run of said belt, said driven mechanism including sprockets geared together and engaging respectively toothed and open slotted portions in opposite runs of the belt.

6. Mechanism for effecting alternate reversals of movement comprising a belt running in an endless loop and having toothed and open slotted portions of corresponding extent in opposite runs of the same and toothed means cooperatively related to said belt and alternately shifted in opposite directions by a toothed portion of one run while an open slotted portion of the opposite run is passing idly over said toothed means.

7. A mechanical movement, comprising an endless belt having oppositely disposed toothed and open portions in the opposite runs of the same and operating with portions of the opposite runs closely approached and traveling in opposite directions, and a sprocket member at said closely approached portions and having teeth projecting through the open portions of one run into engagement with toothed portions of the other oppositely traveling run of said belt.

8. A mechanical movement, comprising an endless belt having oppositely disposed toothed and open portions in the opposite runs of the same, a sprocket member having teeth projecting through the open portions of one run into engagement with toothed portions of the other run of said belt, said toothed and open portions being disposed in the intermediate longitudinal extent of said belt and supporting means for the edges of said belt at the opposite sides of said toothed and slotted intermediate extent.

9. A mechanical movement, comprising belts in side by side relation and travelling in opposite directions and having toothed and slotted portions and sprocket means positioned for cooperation with said toothed and slotted portions of said oppositely running belt members.

10. A mechanical movement, comprising belts in side by side relation and travelling in opposite directions and having toothed and slotted portions and sprocket means positioned for cooperation with said toothed and slotted portions of said oppositely running belt members, said sprockets being fixed to turn together.

11. A mechanical movement, comprising belts in side by side relation and travelling in the same direction and having successively arranged toothed and open portions and sprockets disposed to alternately cooperate with oppositely running toothed and slotted portions of said belts.

12. A mechanical movement, comprising belts in side by side relation and travelling in the same direction and having successively arranged toothed and open portions and sprockets disposed to alternately cooperate with toothed and slotted portions of said belts, one sprocket being in over-running and the other in under-running engagement with corresponding runs of the respective belts.

13. A mechanical movement, comprising belts in side by side relation and travelling in the same direction and having successively arranged toothed and open portions and reversely turning sprockets connected together and disposed to alternately cooperate with toothed and slotted portions of said belts and said belts having oppositely turning engagement with the respective sprockets.

GEORGE A. GILLEN.